July 19, 1927.
R. B. BENJAMIN
1,636,278
ELECTRICAL FIXTURE SUPPORTING DEVICE
Filed May 20, 1921
2 Sheets-Sheet 1
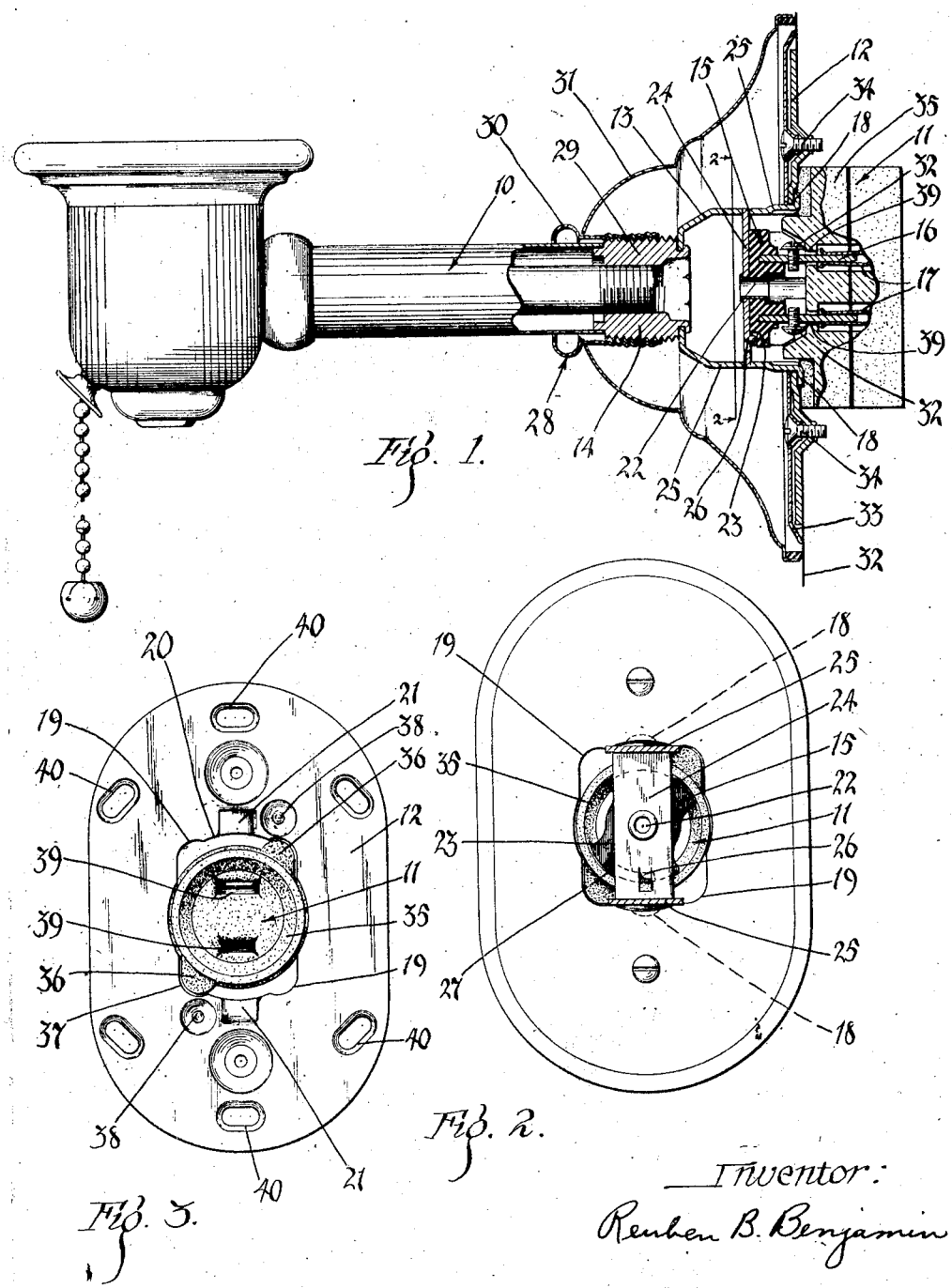
Inventor:
Reuben B. Benjamin
By
Jones, Addington, Ames & Seibold
Attys.

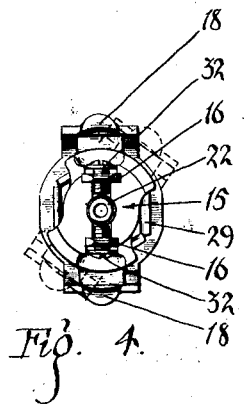
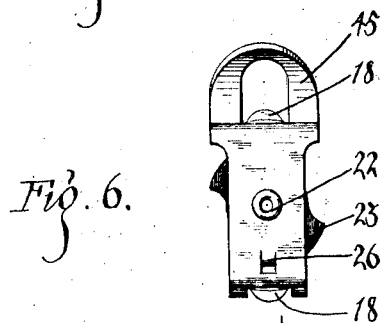
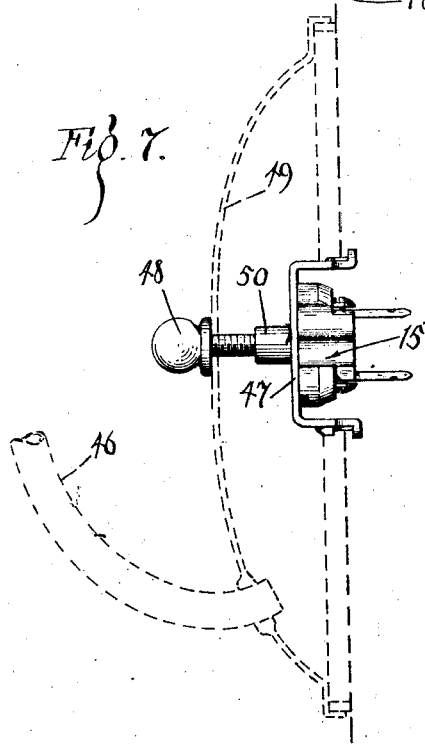
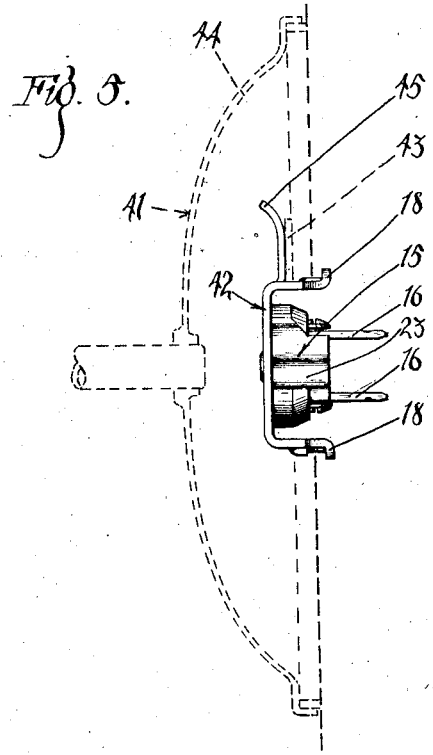

Patented July 19, 1927.

1,636,278

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRICAL FIXTURE-SUPPORTING DEVICE.

Application filed May 20, 1921. Serial No. 471,077.

My invention relates to electrical fixture supporting devices, and the connections therefor.

One of the objects of my invention is to provide an improved fixture supporting device, in which the fixture can be readily connected and disconnected with respect to the receptacle both electrically and mechanically.

A further object of my invention is to provide such a device which will be simple in construction, cheap to manufacture and durable and efficient in use.

Further objects will appear from the detailed description to follow and from the appended claims.

In the drawings, in which several embodiments of my invention are shown—

Fig. 1 is a side elevation, partly in section, of an electrical fixture, with its support and electrical connections;

Fig. 2 is a section on the line 2—2 of Fig. 1;

Fig. 3 is a front elevation of the receptacle with the face-plate removed;

Fig. 4 is a rear elevational view of the plug-in part of the fixture connector;

Fig. 5 is a side elevation showing a different type of fixture, and a different form of plug-in device;

Fig. 6 is a front view of the plug-in device and fixture support shown in Fig. 5, and Fig. 7 is a side elevational view showing still another form of fixture supporting device and connector.

Referring to Figs. 1 to 4 inclusive the construction shown therein comprises an electrical fixture 10, an electrical receptacle 11, a supporting plate 12 (which may be a sort of cover secured to an electrical outlet box) to the inner face of which the receptacle 11 may be secured, a fixture supporting device or bracket 13, permanently secured to the stem 14 of the fixture 10, for supporting the fixture 10 in position with respect to the receptacle 11, and a plug-in device 15 secured to the supporting device 13, and provided with a pair of contact blades 16 for insertion into the receptacle 11 for engagement with the contacts 17 of the receptacle.

The bracket or supporting device 13 has a sort of bayonet joint connection with the supporting plate or cover 12, so that it, together with the fixture 10 and plug-in device 15 which it carries can be quickly connected and disconnected with respect to the receptacle 11. This bayonet joint connection is effected by means of a pair of oppositely disposed outwardly extending retaining projections forming lugs or ears 18 formed integral with the bracket 13, which lugs 18 can be slipped through the notches 19 (Fig. 3) extending from the central opening 20 in the supporting plate or cover 12, and then turned about the axis of the stem 10 a short distance, to bring the lugs 18 into position to enter the pockets or recesses 21 formed in the plate 12.

In order to permit the limited movement of rotation which is necessary to effect the bayonet joint connection described, it is necessary that the plug-in device 15 be mounted on the fixture supporting bracket 13 in such a way as will permit of a certain amount of swiveling between the plug-in device and bracket. This swivel connection is effected by means of an eyelet 22, which secures the insulating base 23 of the plug-in device to a supporting bar 24, which extends between and is secured to the legs 25 of the supporting bracket 13. The swiveling movement of the plug-in device 15 on the bar 24 is limited by means of a lug 26 struck inwardly from the bar 24 which cooperates with an arcuate slot 27 in the insulating base 23 to limit the swiveling movement between the two parts, as indicated in Fig. 2.

In order to draw the supporting bracket 13 forwardly to hold the lugs 18 securely in the pockets 21, a sheet metal screw-threaded member 28 is provided, which is threaded onto the bushing 29 which connects the fixture stem with the bracket 13, this securing member 28 having an annular beaded portion 30, which bears against the outer edge of the canopy 31, forcing the canopy snugly against the supporting surface 32, and drawing the bracket 13 outwardly to hold the lugs securely in the pockets 21. Binding screws 32 for the fixture wires are threaded into the contact blades 13. A finishing or escutcheon plate 33 may be provided for the outlet box, this escutcheon plate being secured to the supporting plate or cover 12 by means of countersunk screws 34. The insulating base 35 of the receptacle may be provided with a pair of positioning lugs 36 engaging correspondingly located notches 37 in the supporting plate 12. The supporting plate 12 is shown as provided with a number of holes or slots 40, for using in securing the cover in position with various types of outlet boxes.

The base 35 may be secured to the plate 12 by means of a pair of screws 38 (Fig. 3) extending through openings in the insulating base and threaded into the cover 12. The cover 12, the bracket 13 and the cross-bar 24 may be formed of sheet metal stampings.

In connecting the fixture electrically and mechanically, the fixture 10 is presented to the receptacle 11 in position to permit the contact blades 16 to enter the openings 39 which lead to the recesses in which the receptacle contacts 17 are located. The fixture 10 is then turned about the axis of its stem to bring the lugs 18 on the fixture supporting device opposite the notches 19 in the supporting plate 12, then pushed in until the lugs 18 are back of the plate 12, and then turned to bring the lugs 18 opposite the pockets 21. The swivel connection between the plug-in device 15 and the fixture supporting bracket 13 permits this tilting of the fixture about the axis of its stem without interfering with the insertion of the contact blades 16 into the receptacle. The canopy 31 is then pushed up against the supporting surface 32, and the securing member 28 is screwed onto the bushing 29 to cause the canopy 31 to bear firmly against the supporting member 32, and to draw the bracket 13 outwardly to hold the lugs 18 securely in the pockets 21.

The construction shown in Fig. 5 is quite similar to the construction just described, but here the fixture 41 is secured in place with respect to the fixture supporting bracket 42 by means of a strap 43, the ends of which are secured to the canopy 44, and the center of which engages behind an upwardly extending post 45 formed integral with the bracket 42.

The construction of the plug-in device 15 is the same as in the form previously described, as is also the connection between the bracket 42 and the plug-in device 15 and between the bracket 42 and the receptacle.

In making the electrical and mechanical connection with this construction, the blades 16 are inserted into the openings of the receptacle, the bracket 42 is turned to bring the lugs 18 opposite the notches 19 in the cover plate 12, the bracket is then pushed in, and turned to bring the lugs 18 opposite the pockets 21, and the fixture 41 is then secured in position by hooking the strap 43 in back of the upwardly extending post 45.

The construction shown in Fig. 7 is substantially the same as that shown in Figs. 5 and 6, except that here the fixture 46 is secured to the supporting bracket 47 by means of a screw 48, which extends through an opening in the canopy 49, and is threaded into a sleeve 50, secured to or formed on the bracket 47. The construction is otherwise as in the forms shown in Figs. 5 and 6, the plug-in device 15 being the same, and the connection between the bracket 47 and the receptacle and between the bracket 47 and plug-in device. The manner of making the electrical and mechanical connection is also the same, the supporting device 47 being first secured in position, and the canopy 49 being then secured to the supporting device 47 by means of the screw 48.

While I have shown but a few embodiments of my invention, it is obvious that it may be embodied in other forms, covered and defined in the appended claims.

Having thus described my invention, what I claim as new and desire to secure by Letters Patent of the United States is:

1. A fixture, a receptacle, a push-in electrical connector for cooperation with said receptacle, a supporting member, a mechanical connecting member, and canopy for housing said mechanical connecting member, said mechanical connecting member being carried by said fixture, said push-in connector having a swivel connection with said mechanical connecting member, said mechanical connecting member having a connection with said supporting member which is effected by a plurality of movements, including one of insertion and one of rotation, and means cooperating with said canopy for holding said mechanical connecting member in connected position.

2. A fixture, a receptacle, a push-in electrical connector for cooperation with said receptacle, a supporting member, a mechanical connecting member, said mechanical connecting member being carried by said fixture, said push-in connector having a swivel connection with said mechanical connecting member, said mechanical connecting member having a connection with said supporting member which is effected by a plurality of movements, one of insertion, and one of rotation, and means for holding said mechanical connecting member in connected position, comprising a member having a screw-threaded connection with said mechanical connecting member.

3. A fixture, a receptacle, a push-in electrical connector for cooperation with said receptacle, a supporting member, a mechanical connecting member, said mechanical connecting member being carried by said fixture, a push-in connector having a swivel connection with said mechanical connecting member, a canopy, said mechanical connecting member having a connection with said supporting member which is effected by a plurality of movements, including one of insertion, and one of rotation, and means for holding said mechanical connecting member in connected position comprising a member having a screw-threaded connection with said mechanical connecting member and bearing on said canopy.

4. Means for manually and electrically connecting fixtures with respect to a receptacle which has two similarly housed contacts, comprising a plate apertured to permit the passage of securing members and contact blades, a plug having a pair of contact blades for engaging said contacts respectively, and an insulating base on which said blades are mounted, said base having a central opening intermediate said blades, a securing bracket, and means providing a swivel connection between said bracket and base, comprising a pivot member secured in said central opening, said bracket having securing members which pass through said apertured plate and engage behind said plate by a swivel motion of the bracket.

5. Means for manually and electrically connecting a fixture with respect to a receptacle which has two similarly housed contacts, comprising a plate apertured to permit the passage of securing members and contact blades, a plug having a pair of contact blades for engaging said contacts respectively, and an insulating base on which said blades are mounted, and means providing a swivel connection between said bracket and base, comprising a pivot member located intermediate said blades.

6. The combination with a fixture, of means for electrically and manually connecting said fixture with respect to a receptacle which has two similarly housed contacts, comprising a plate apertured to permit the passage of securing means and contact blades, a plug having a pair of contact blades for engagement with said contacts respectively and an insulating base on which said blades are mounted, and means for providing a swivel connection between said bracket and base, said bracket having securing means which pass through said apertured plate and engage behind said plate by a swivel motion of the bracket, said fixture being rigidly secured to said bracket to turn therewith in its swivelling movement.

In witness whereof, I have hereunto subscribed my name.

REUBEN B. BENJAMIN.